United States Patent
Larsen et al.

(10) Patent No.: US 7,068,791 B1
(45) Date of Patent: Jun. 27, 2006

(54) SECURE PACKET RADIO NETWORK

(75) Inventors: Mark Sievert Larsen, Pretoria (ZA); James David Larsen, Pretoria (ZA)

(73) Assignee: IWICS Inc., Bothell, WA (US)

( * ) Notice: Subject to any disclaimer, the term of this patent is extended or adjusted under 35 U.S.C. 154(b) by 0 days.

(21) Appl. No.: 09/355,898

(22) PCT Filed: Feb. 9, 1998

(86) PCT No.: PCT/GB98/00392

§ 371 (c)(1),
(2), (4) Date: Sep. 24, 1999

(87) PCT Pub. No.: WO98/35474

PCT Pub. Date: Aug. 13, 1998

(30) Foreign Application Priority Data

Feb. 7, 1997 (ZA) ..................... 97/1017

(51) Int. Cl.
*H04L 9/00* (2006.01)
*H04L 9/08* (2006.01)
*G07F 7/10* (2006.01)

(52) U.S. Cl. ............... 380/279; 380/270; 380/277; 713/155; 713/168; 713/171; 709/238; 709/240; 726/4; 726/9; 726/27

(58) Field of Classification Search ........ 380/279–284; 713/168–172, 201; 709/227–240
See application file for complete search history.

(56) References Cited

U.S. PATENT DOCUMENTS

| | | | |
|---|---|---|---|
| 4,864,564 A | 9/1989 | Parker et al. | 370/94 |
| 4,912,762 A * | 3/1990 | Lee et al. | 705/71 |
| 5,475,757 A | 12/1995 | Kelly | 380/24 |
| 5,485,519 A | 1/1996 | Weiss | 380/23 |
| 5,642,420 A * | 6/1997 | Kuroda et al. | 380/30 |
| 5,809,141 A * | 9/1998 | Dent et al. | 380/247 |
| 6,167,513 A * | 12/2000 | Inoue et al. | 713/150 |
| 6,373,946 B1 * | 4/2002 | Johnston | 380/211 |
| 2004/0205248 A1* | 10/2004 | Little et al. | 709/246 |

FOREIGN PATENT DOCUMENTS

| | | |
|---|---|---|
| EP | 0254812 | 4/1987 |
| EP | 0387599 | 2/1990 |

(Continued)

OTHER PUBLICATIONS

Khalil, Issa, et al, 'Analysis and Evaluation of SECOS, a Protocol for Energy Efficient and Secure Communication in Sensor Networks', Purdue University, 2005, entire document, http://shay.ecn.purdue.edu/~dcsl/Publications/papers/2005/final_secos_adhoc04_revision.pdf.*

*Primary Examiner*—Christopher Revak
*Assistant Examiner*—Ronald Baum
(74) *Attorney, Agent, or Firm*—Ladas & Parry LLP

(57) ABSTRACT

A packet radio network comprises at least one network operator station and a number of user stations. The user stations transmit message data to one another, either directly or via intermediate stations. When stations are first activated, they transmit key request messages to the network operator station. Other, authenticated stations in the network will not communicate with the new station, but will pass the key request message to the network operator station. The network operator station transmits the necessary keys back to the new station via the other stations to permit the new station to operate. Each user station transmits key probe signals from time to time which advise other stations of its public key.

16 Claims, 6 Drawing Sheets

FOREIGN PATENT DOCUMENTS

| | | |
|---|---|---|
| EP | 0738058 | 4/1996 |
| WO | 9512942 | 5/1995 |

\* cited by examiner

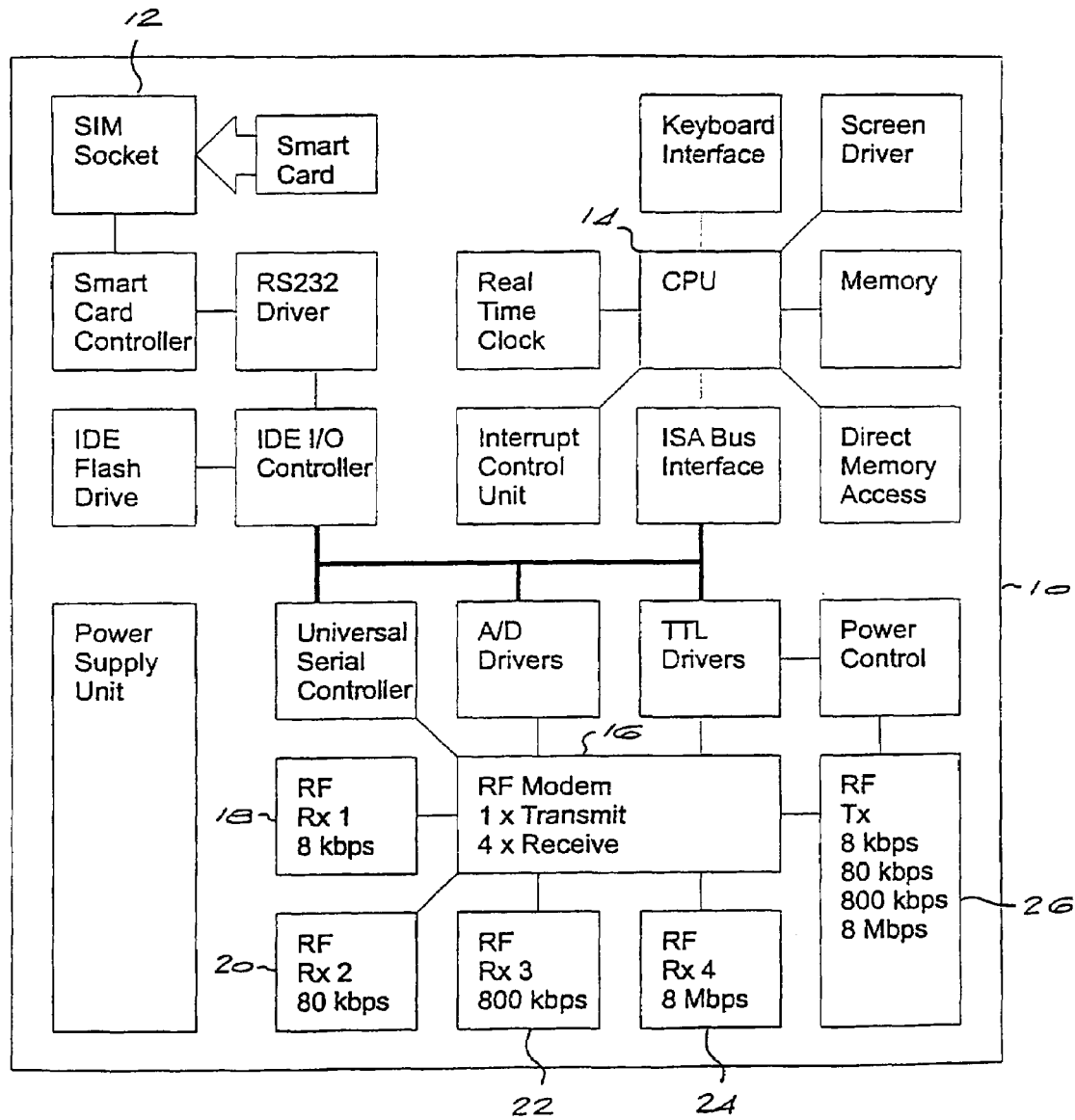

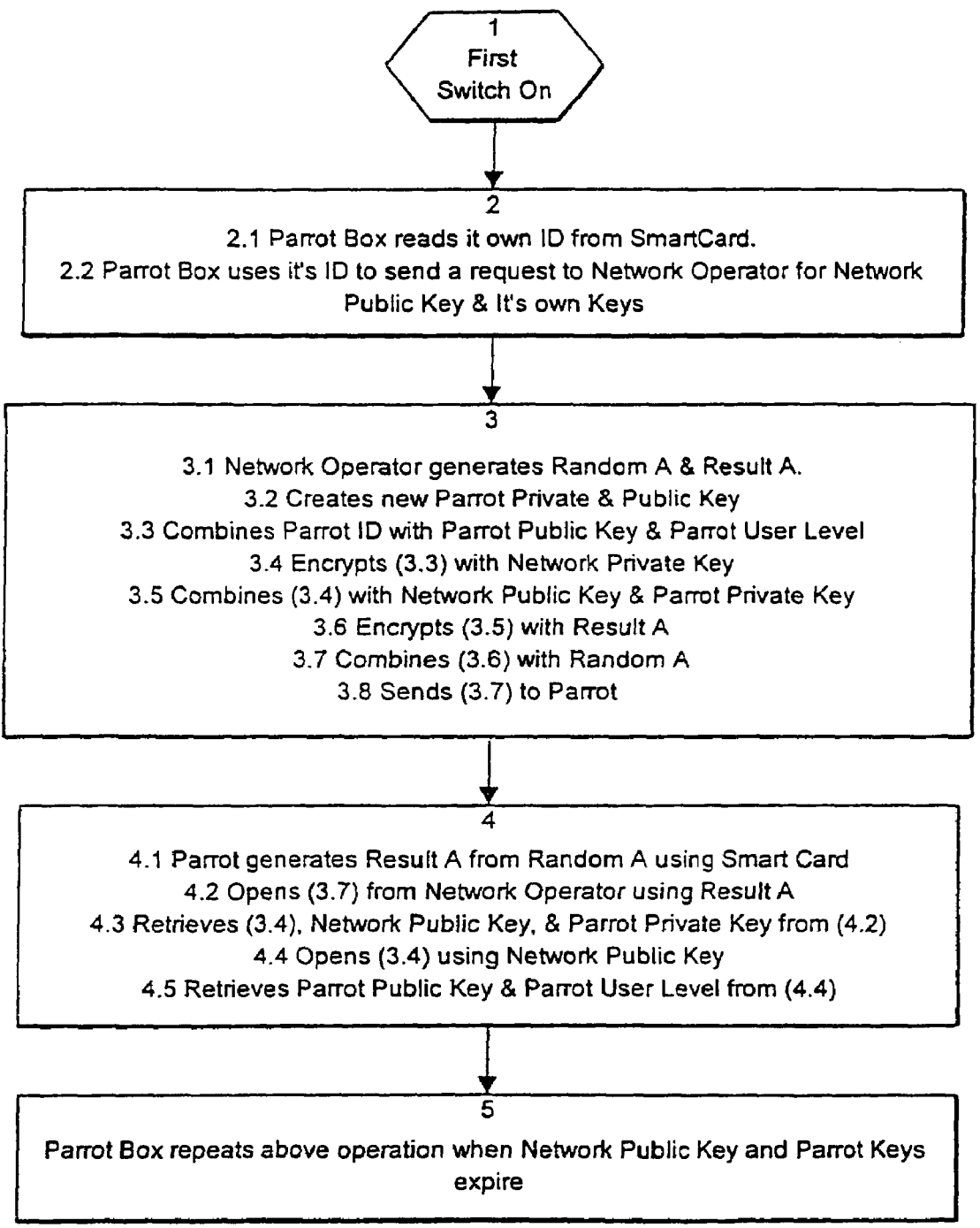

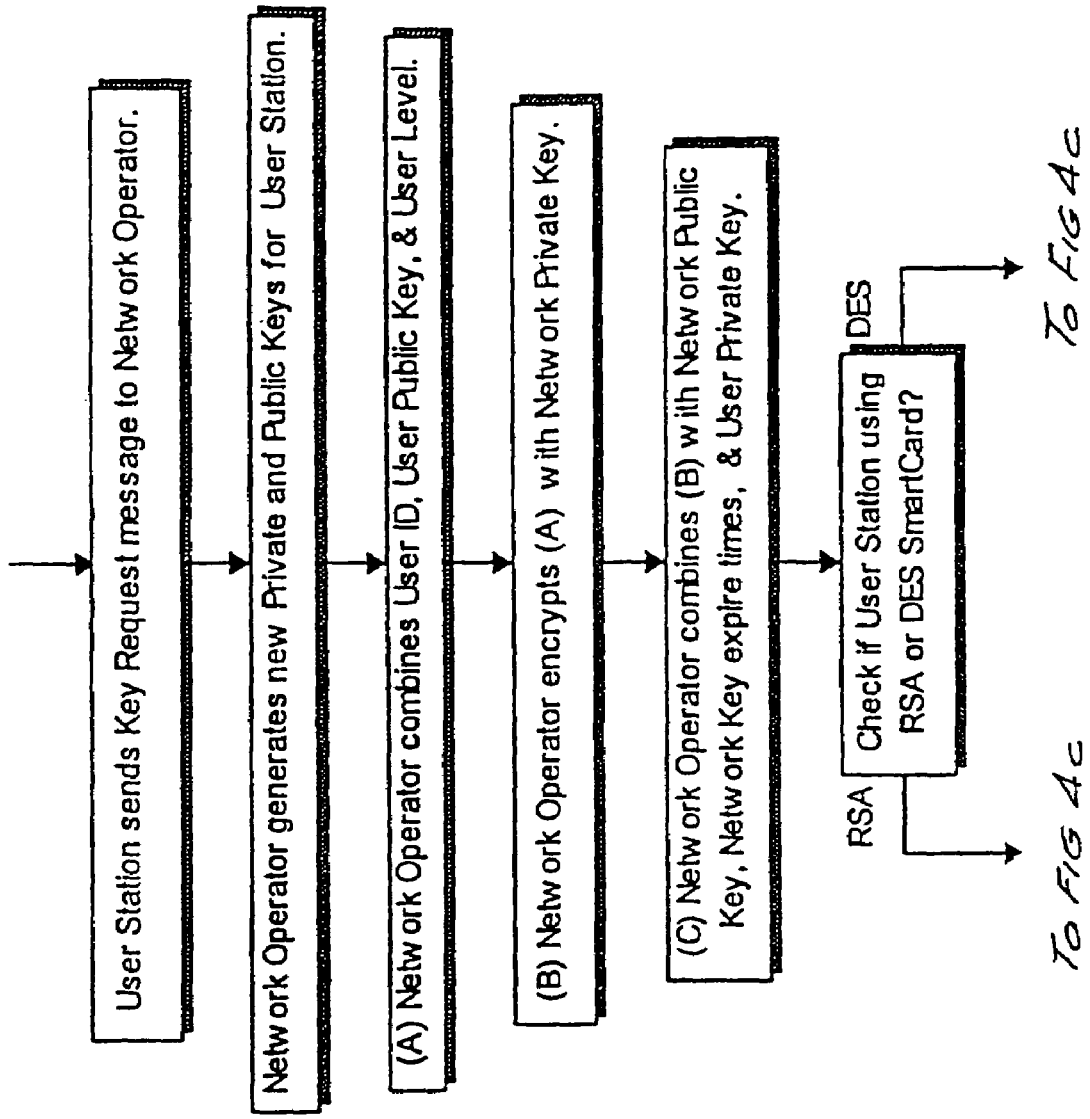

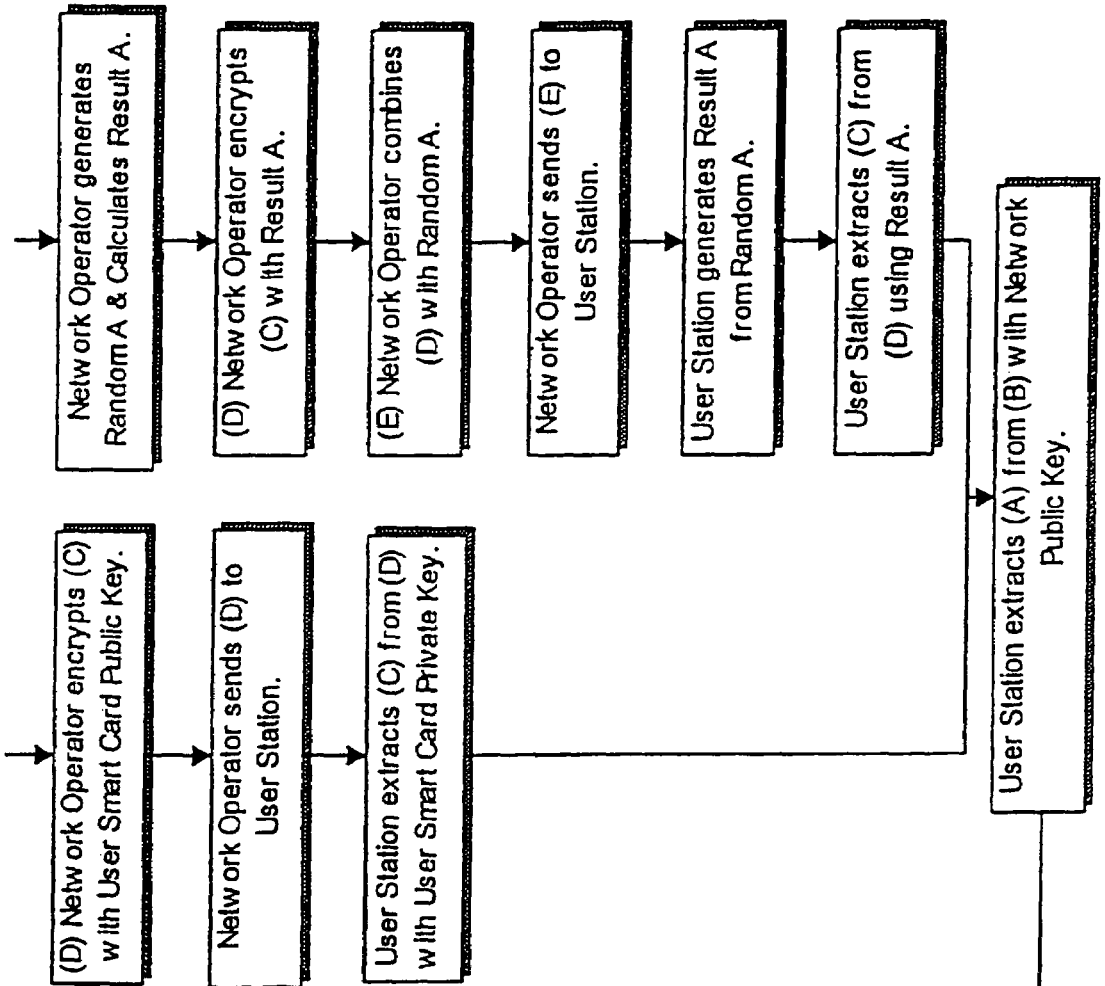

SECURE PACKET RADIO NETWORK

BACKGROUND OF THE INVENTION

THIS invention relates to a method of operating a network, typically a packet radio network, which comprises a network operator station and a plurality of user stations.

A network of this general kind is described in PCT patent application no. WO 96/19887 and comprises a plurality of stations which monitor each other's activity and transmit message data to one another, either directly or via intermediate stations, in an opportunistic manner. One or more of the stations can function as a network operator station which regulates the access of other stations to the network and thus to desired destination stations.

In a commercial implementation of such a network it is necessary to uniquely identify each station and to control its access to the network, both for security and billing purposes. This will prevent, for example, continued use of the network by a subscriber whose account has fallen into arrears, and the interception of messages by an unauthorised station.

The different stations may communicate via the same or different media. The principle by which the stations generate their routing information is by detecting other stations in their immediate vicinity, and monitoring the data these stations send. By monitoring the contents of the data, a station will be able to dynamically find routes to other stations in the network. This will allow a station to send data to any other station, via any intermediate station, in the network even though it can not directly communicate with the destination station.

If someone were to place an unauthorised station in the network, with an ID that belonged to another station, it would cause routing problems and allow the unauthorised station to intercept the data. Therefore it would be necessary to make sure that no unauthorised station could cause legitimate stations to send it any data, and to ensure that a transmission from the unauthorised station does not interfere with the dynamic routing tables in the legitimate stations.

SUMMARY OF THE INVENTION

According to the invention there is provided a method of operating a network comprising a network operator station and plurality of user stations adapted to transmit message data to one another, directly or via intermediate user stations, the method comprising:

generating at least one key required for use by the user stations;

transmitting to the network operator station, from a first user station requiring a key, a key request message containing first status data indicative that the message originates from a user station lacking a key;

transmitting, from the network operator station to the first user station, a key data message containing a key for use by the first user station and second data corresponding to the first status data; and at any user station receiving the key data message, forwarding the message to the first user station if the second status data thereof meets at least one predetermined criterion.

The key request message from the first user station may be received by at least one intermediate station and forwarded to the network operator station if the first status data thereof meets at least one predetermined criterion.

Preferably the key request message transmitted from the first user station contains first status data identifying the key request message as a first message transmitted by that station.

Similarly, the key data message transmitted by the network operator station preferably contains second status data identifying the key data message as a response to the key request message.

The method may include recording, at any user station receiving the key request message, the identity of the first user station and the first status data thereof.

At user stations recording the first status data from the key request message, data corresponding to the identity of the first user station is preferably flagged to indicate that the identity data may be used for no other purpose than the transmitting of a key data message originating at the network operator station to the first user station.

The key data message may comprise a network operator's public key which is utilised by the first user station and all active user stations to decrypt messages from other stations which are encrypted with that key's corresponding private key.

The key data message may further comprise a station public key and a station private key allocated by the network operator to the first user station.

Messages transmitted from an originating station to a destination station are preferably encrypted at least partially using at least one of the private key of the originating station, the public key of the originating station, and the public key of the destination station.

Each user station may transmit a key probe signal from time to time, the key probe signal containing identification data and the station public key of the station transmitting the key probe signal, encrypted with the network operator's private key, other stations receiving the key probe signal decrypting the signal using the network operator's public key to extract the identification data and station public key therefrom, for use when transmitting message data to the station which transmitted the key probe signal.

The key request message may have a plurality of parameters which differ from corresponding parameters of normal network messages. For example, the message may have a different, preferably shorter, length than normal messages and may have a different, preferably longer, time to die.

Further according to the invention there is provided a network comprising a network operator station and plurality of user stations adapted to transmit message data to one another, directly or via intermediate user stations, each user station comprising a transceiver for sending data to and receiving data from other stations in the network; and processor means for generating a key request message for transmission to the network operator station, the key request message containing first status data indicative that the message originates from a user station lacking a key, and for receiving a key data message from the network operator station containing a key for use by the user station, thereby to enable the user station to communicate with other stations in the network.

Each user station may include token reader means for reading identification data from a secure token associated with a user, the identification data being included in messages transmitted by the user station.

The secure token may be a "smart card".

The invention extends to a user station adapted for use in a network comprising a network operator station and a plurality of user stations adapted to transmit message data to one another, directly or via intermediate user stations, the user station comprising a transceiver for sending data to and receiving data from other stations in the network; token reader means for reading identification data from a secure token associated with a user; and processor means for generating a key request message for transmission to the network operator station, the key request message containing first status data indicative that the message originates from a user station lacking a key, and for receiving a key data message from the network operator station containing a key for use by the user station, thereby to enable the user station to communicate with other stations in the network.

BRIEF DESCRIPTION OF THE DRAWINGS

FIG. 2 is a more detailed block diagram of the transceiver unit of FIG. 1;

FIG. 3 is a simplified diagram illustrating the basic operation of the network protocol.

DESCRIPTION OF EMBODIMENTS

Figure 1:
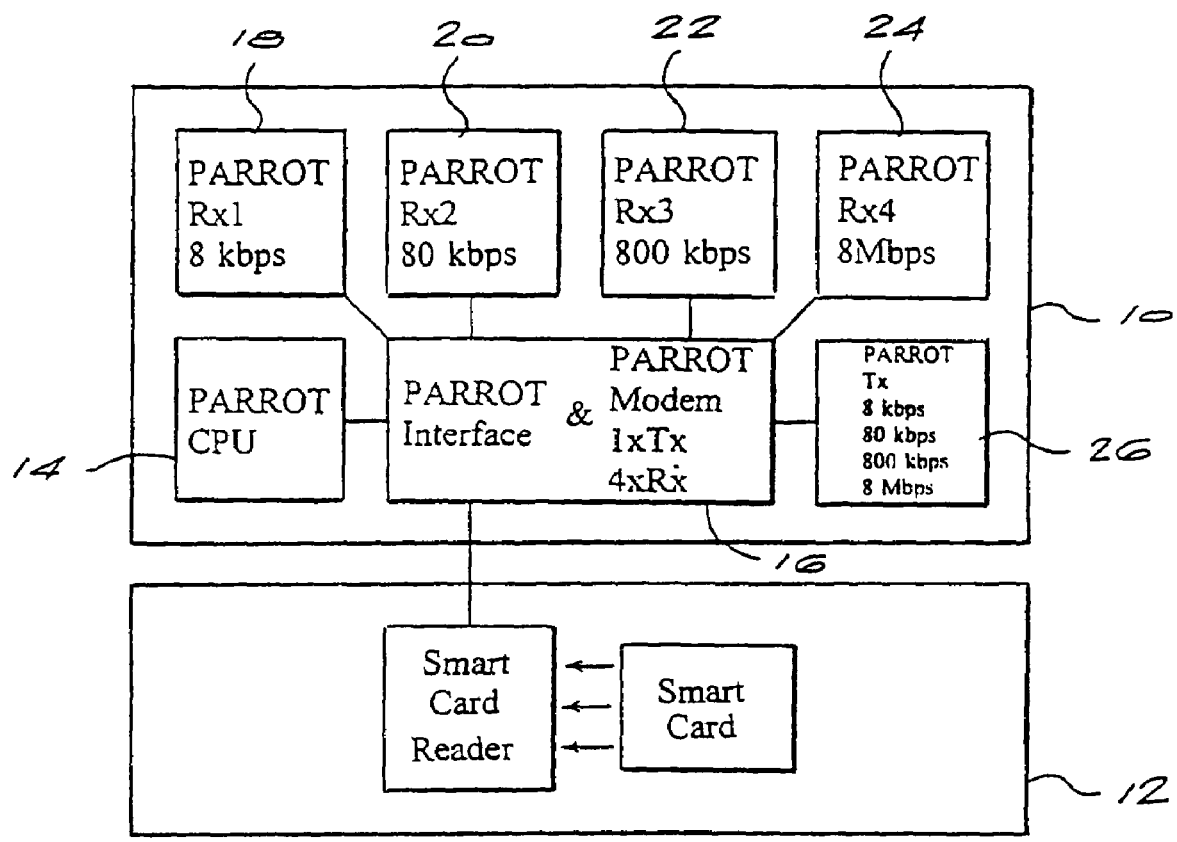
FIG. 1 is a simplified block diagram of a transceiver unit which functions as a user station in a network of the invention.

The present invention relates to a protocol for operating a network in which a number of user stations transmit messages to one another, either directly or via intermediate stations. An example of such a network is described in PCT patent application no. WO 96/19887, the contents of which are incorporated herein by reference.

Although the abovementioned patent application describes a packet radio network it will be appreciated that the invention is applicable to other networks in which user stations can communicate with one another via intermediate stations in the network.

Networks of the kind referred to above can be utilised commercially, with users being subscribers who are billed for their use of the network. Alternatively, networks of this kind may be utilised by security forces such as police or military forces. These applications are given by way of example only.

In almost all likely applications, the security of the network is important, whether due to the need for a commercial operator to preserve the security of clients' data and billing information, or due to the sensitive nature of information transmitted in a military application, for example. It is also important, in a commercial network, to maintain security for billing purposes, so that only authenticated stations are able to utilise the network, and permitting stations to be disabled in the case of non-payment of the user's account, for example.

To ensure security of data transmissions, each user station in the network will encrypt all packet headers (following the Sending ID), with its Private Key. Every tenth probe (Key Probe) will not be encrypted, and will contain the ID and Public Key of the user station that has been encrypted by the Network Operator's Private Key (see below). Therefore any other user stations that have the correct Network Operator's Public Key will be able to verify the ID and Public Key of the user station.

All transmissions except for the occasional Key Probe will be encrypted. Key Probes will not be used to adjust routing tables or any other adaptation parameters. They will only be used to acquire the Public Key of the other user stations.

User stations will not respond to Key Probes. They will only respond to probes and packets that have been encrypted and verified.

The Network Operator's Public Key and the user station's own Public and Private Keys must be acquired from the Network Operator when a user station is first switched on. The Network Operator's Public Key will change on a regular basis. Therefore a user station must always make sure that it has the latest Network Operator's Public Key.

When a user station gets the Network Operator's Public Key from the Network Operator, the Public Key will have a serial number, a renewal time, an expire time, and a delete time. When the renewal time is reached the user station must get the next Network Operator's Public Key. However it will keep using the current Key until it expires. This will give all the user stations a chance to get the new Key before the old one expires.

Not all user stations will have their time exactly synchronised, therefore they will keep the old Key until the delete time arrives. During this period a station will distinguish between the two different Keys by a Key serial number which is included in the header. However once the delete time has arrived it will no longer accept headers with an old Key.

FIG. 1 shows a block diagram of a user station in the form of a radio transceiver 10 with an associated Smart Card reader 12. The Smart Card reader can be internal or external to the transceiver. The block diagram of the transceiver unit in FIG. 1 corresponds essentially to the units described in the abovementioned PCT patent application.

The unit includes a CPU 14 which is connected to an interface and modem circuit 16. The unit includes multiple receiver modules 18 to 24 which can receive incoming data at different data rates over a four decade range. The unit includes an output/transmission module 26 which operates over the same range, allowing the unit to operate at different data rates according to the quality of the link between stations.

When the user station is turned on it must first read the Smart Card to get its ID. It then checks if the Network Operator's Public Key has expired, or if the ID in the smart card is different from the one it last used (it stores this information on a local Flash Drive). If either of these two conditions is true it must then follow the procedure outlined in FIG. 3 or 4. This entails creating a message which is then transmitted by the modems and transmitter to the Network Operator station.

When the Smart Card is removed, the user station must stop operating. The Smart Card reader sends a message to the transceiver when the card is removed. However, if the connection between the reader and the transceiver is tampered with, the message would not arrive at the transceiver. To prevent a transceiver from communicating without a Smart Card, the transceiver will check the status of the Smart Card on a regular basis to make sure it has not been removed. This will involve using the Smart Card to decode a random number encoded with its Public Key. If the correct Smart Card is present it will correctly decode the number. The random number will be encoded using the software in the transceiver. Therefore if a user removes the Smart Card after tampering with the line, the software in the transceiver will stop running after a predetermined interval.

FIG. 3 shows the process through which the user station will get the Network Operator's Public Key and its own Public and Private Keys. This diagram assumes the use of a DES type of Smart Card. If an RSA type Smart Card is used then the Network Operator would not generate Random A and Result A, and would encrypt the Message with the RSA Public Key associated with the user station ID. The user station will in turn decrypt the message with its Private Key. All the other steps remain the same. (See FIG. 4 for a diagram illustrating both options.) The RSA Smart Card will only be used to get a new Public and Private Key. The new keys will be used when communicating with other user stations and are subject to expire in the same way as the Network Operator's Public Key.

When using a DES Smart Card the Result A is generated by applying the DES algorithm to Random A. The Result A is then used to encrypt the whole message. This allows the encryption of the whole message to be done using a faster processor than the Smart Card. However if the Smart Card is used to encrypt the whole message then Random A and Result A are not needed. In this case the whole message is encrypted by the Network Operator using the secret key associated with the user station. The user station will then decrypt the whole message using the Smart Card.

The Network Operator station is typically another transceiver unit which is connected to a computer which keeps information on all the user stations operating in the Network. This computer will generate the Public and Private Keys for the user station, and it also keeps the Network Operator's Private and Public Keys. The Network Operator computer also contains all the numbers associated with the Smart Cards in every user station. This allows the Network Operator to send the Private Key of the user station back to the user station without any other user station being able to retrieve the Key.

More than one Network Operator station may be present in a network and will all be connected to the central Network Operator computer. One or more backup Network Operator computers may also be connected to the Network Operator station in case of failure.

When a user station is switched on for the very first time it will not have the current Network Public Key or its own Public and Private Key. Therefore it needs to communicate with the Network Operator in order to get the Keys. However, if it is not in the vicinity of the Network Operator it will not be able to send it a message as all other user stations will ignore the new user station, as they cannot verify it. Therefore a method is required to allow the other user stations to help the new one get its Keys without affecting their routing tables or jeopardising the security of the network.

When a user station is trying to get a new set of keys for the very first time, it will generate a special message for the Network Operator that must have a message number of one (1). This number will be reserved for the sole purpose of retrieving Keys from the Network Operator.

When any other user station in the network sees this message it will create a new ID in its routing tables which will be the same as the Origin ID of the message, with an added flag indicating that it should not use this Flagged ID for sending any data other than a response message from the Network Operator which will also be numbered one (1). If this turns out to be a "bogus" or unauthorised user station, or if the user station in question was turned off long enough for the Keys to expire, but not long enough to be removed from the routing tables, then two identical IDs will appear in the routing tables of the other user stations. The Flagged ID will be used for the routing of messages with a number of one (1), and the other ID will be used for all other messages.

The other user stations will also only allow these Key messages to pass if they are of the correct size, and have the correct Time-To-Die associated with them. This will prevent an unauthorised user station from flooding a network with many Key request messages. Since the message is small and will have a long Time-To-Die associated with it, such an unauthorised station will only be able to send out limited traffic.

If a user station is trying to get a Key update, but its current Keys are still valid, then it will request the new Keys without using a special message number. This is required since the message requesting the Key will not be small, as it will also contain billing information. Therefore the message will be treated and routed like any other message.

In the same way that the message has a special number, so must the respective Probe and Data packets. This will allow the user station to introduce the message into the network. However other user stations will only accept these special probes because of the number of the Probe and Data Packet i.e. one (1). Furthermore the other user stations will only accept a message of number one (1) from such a Data packet. They will also add the same Flagged ID for this type of Probe. The response Data packet from a legitimate user station will also be numbered one (1). This will allow other user stations monitoring the interaction to know they must Flag the ID associated with the response.

It is conceivable that an unauthorised Network Operator station is set up with the purpose of infiltrating a network and intercepting messages. To prevent this from happening a user station must be able to verify the authenticity of the Network Operator. If a user station can not verify the Network Operator then the user station will not allow itself access to the network.

In order for the user station to authenticate the new keys sent to it from the Network Operator, the Network Operator must sign the new set of keys using its Permanent Authority Private Key. The signed message can be verified by the user station's Smart Card. Every such Smart Card has an Authority Public Key. This key remains unchanged, and is permanently locked in the Smart Card. A number of users may share the same set of Authority Keys. If the Authority Keys should be recovered by a third party, that particular set can be removed from operation. This will mean that the users that share that particular set of Authority Keys will have to get a new Smart Card in order to continue using the network. It may be possible to assign each user their own Authority Key set, thus reducing the number of users that would need to update their Smart Card in the event of a security breach.

When a user station is switched on for the first time it has no billing information, and as such the Key Request Message will always be the same size, hence other user stations will only accept one size for the Message. However when the user station requests a new set of Keys because the current ones are about to expire, it will also include billing information with the request.

The billing information will include a list of user station IDs that the local user station has either sent data to or received data from. With each of the IDs the following details will be also sent:

Total amount of data sent to remote transceiver ID.

Total amount of data sent that was acknowledged by remote transceiver ID.

Total amount of data that was received from remote transceiver ID.

Special resources used (e.g. Internet Data)

Statistics relating to power consumption, packet and message errors, etc.

Total amount of data sent on behalf of third party stations (ie. relayed data).

This information will then be cross referenced by the Network Operator with the billing information received from other transceiver ID's. This will then be used for determining how much to bill the user of each transceiver.

The network operator may credit a user who has actively relayed data on behalf of other stations, thereby encouraging users to leave their stations on.

The link level and/or message level of the above described protocol can be signed and/or encrypted. The Keys used in the method can be used for the signing and/or encryption of the message header and/or the entire packet.

Each Data packet contains two CRCs. The first CRC is contained in the header and is the CRC of the header. The second CRC is at the end of the packet and is a CRC of the entire packet, including the header.

The reason for the use of two CRCs is to allow the protocol to determine the origin of a packet if only the header comes through correctly, but the packet is invalid due to an error. Typically a station would first check the packet CRC. If it were correct, it would then assume that the header CRC is also correct (since the header is included in the packet CRC). If the packet CRC is in error, then the header CRC is checked. If the header CRC passes then the station can assume that the information contained in the header is correct. This header information could then be used for adaptive retransmissions even though the data was lost.

In order to "sign" the packet, the CRC of the header and/or packet can be encrypted using the Private Key of the sending station. The receiving station would then decrypt the CRC using the Public Key of the sending station.

If the packet needs to be secured, then the whole header and/or packet can be encrypted using the Public Key of the receiving station. The receiving station would then decrypt the header and/or packet using its Private Key.

The header and/or packet could be both signed and secured by first encrypting the CRC with the sending station's Private Key, then encrypting the entire header and/or packet using the Public Key of the receiving station.

The only part of the header and/or packet that would not be encrypted would be the first part thereof, up to where the type of packet is identified, and possibly up to the receiving ID (see the packet structure below). Thus a station would not try to decrypt every packet it receives, only those that are indicated as having been encrypted and/or signed (packet type). Furthermore, a station which is not the receiving station would not try to decrypt the packet.

The protocol relies on the fact that a station can gather information from third party transmissions on a calling channel. Therefore the packet transmissions would not be encrypted on the calling channel, only signed. However once two stations move to a data channel, they can then both encrypt and sign the packets.

Even if the packets are encrypted on the link layer, a third party at an intermediate station is not prevented from analysing the packet after the hardware has decrypted it. Therefore it would be important to encrypt any data sent over the network at the message layer. In the case where the end user is already using some form of encryption on their data it may not be necessary to encrypt the messages.

When data enters the network (e.g. a user types a message at a terminal), the message would be signed using the Private Key of the Origin Station, and encrypted using the Public Key of the Destination Station. When the message arrives at the Destination Station the message would be decrypted using the Private Key of the Destination Station, and verified using the Public Key of the Origin Station.

This signed and/or encrypted message would then remain unchanged as it progresses through the network via intermediate stations. Therefore anyone at an intermediate station would not be able to access and/or tamper with the contents of the message.

The Destination Station would typically only have the Public Keys of stations in its immediate vicinity (from Key Probes). If the Destination Station does not have the Public Key of the Origin Station it can send a Key Request message to the Network Operator, requesting the Public Key of the Origin Station.

The Network Operator would then send a message that contains the Origin Station ID and its Public Key, encrypted using the Private Key of the Network Operator. This would have the same effect as if the Destination Station heard a Key Probe from the Origin Station (see below).

For long packets and/or messages the RSA method of encryption would be very slow. In these circumstances an alternative, faster encryption method could be used, such as DES. The key used for the DES algorithm could then be encrypted using the RSA Public Key of the Destination Station. The encrypted key would then be attached to the message before signing it. The Destination station would then extract the DES key using its RSA Private Key. The extracted DES key would then be used to extract the entire packet.

Although a key length of between 16 and 128 bits is typical, it should be noted that longer keys could be used. However, longer keys require more computation power, and also add additional overhead to the size of the packets and messages. Therefore a compromise between key length, processing power and packet size must be determined. Typically, as the power of computers increases, so must the length of the keys be increased.

It should be noted that the Private and Public Keys of both the user stations and the Network Operator are changed at regular intervals, which means that shorter keys can be used (the keys would probably already have changed by the time someone "cracks" the code). Thus on the link level, shorter keys may be used. However, for data security at the message layer longer keys may be needed, assuming that it is required that the data must always remain secure, even after transmission through the network.

In the above described system, the Network Operator Key expires. When a station gets the new Network Operator Key, the station itself also receives a new key. Therefore the key serial number of the Network Operator would also apply to the station's keys. However it would be possible to assign a separate key serial number for the user stations, thereby allowing the user station's keys to remain valid for longer or shorter times, as required. The user station would still follow the same procedure to acquire a new key, but the Network Operator Serial number would remain the same, and the user serial number would change (or vice versa).

In the above described system, the CRC of a message or packet is signed. However, a more secure method would be to use a hash function that would create a message digest or digital fingerprint of the data to be signed. The advantage of the hash function is to make it harder to create an altered message that generates the same hashed value. It will be appreciated that either a CRC function or a hash function could be used for the signing of packets or messages.

Below is the basic structure of the probe and data packets used in the method of the invention:

| Probe or Data Packet | | |
|---|---|---|
| Variable | Bit Len | Allows |
| Preamble | 64 | Modem training sequence (101010101010 etc . . . ) |
| Sync1 | 8 | 1st Sync character for packet detection |
| Sync2 | 8 | 2nd Sync |
| Sync3 | 8 | 3rd Sync |
| Packet Size | 16 | Size of packet |
| Size Check | 8 | Packet Size Check |
| Protocol Version | 8 | Protocol Version 1 -> 255 |
| Packet Type | 8 | Indicates Type and if header and/or packet signed and/or encrypted |
| Sending ID | 32 | ID transmitting packet |
| Receiving ID | 32 | ID to receive packet |
| Packet Number | 16 | Packet number 1 -> 65 535 |
| Adp Parameters | 72 | Adaption Parameters used by Parrot Link Layer |
| Header CRC | 16 | 16 to 128 bits, depending on level of security required |
| Data | x | Contains higher level data for protocol |
| CRC | 32 | 32 to 128 bits, depending on level of security required |

Probe packets (containing no data) would typically be sent out on a calling channel requesting a response from Destination Station having a particular ID (Receiving ID). The probe packets would typically not be encrypted, but would be signed, thus allowing other stations to gather required information for routing.

When a station responds to a probe, it would do so on a data channel using a Data packet (containing data). The Data packet would be signed, and could optionally be encrypted, since no other station needs the information contained therein.

The length of the packet CRC is set at a minimum of 32 bits for reliable error detection at the link level.

| Key Probe Packet | | |
|---|---|---|
| Variable | Bit Len | Allows |
| Preamble | 64 | Modem training sequence (101010101010 etc . . . ) |
| Sync1 | 8 | 1st Sync |
| Sync2 | 8 | 2nd Sync |
| Sync3 | 8 | 3rd Sync |
| Packet Size | 16 | Size of packet |
| Size Check | 8 | Packet Size Check |
| Protocol Version | 8 | Protocol Version 1 -> 255 |
| Packet Type | 8 | Indicates Type (Key Probe) |
| Sending ID | 32 | ID of station transmitting packet |
| Network Key Serial | 8 | Network Operator Public Key Serial Number |
| Encrypted ID & Key | x | Sending ID & Public Key Encrypted (x = 56 to 168 bits) |
| CRC | 32 | 32 bit CRC for whole packet, including header |

Key Probes are sent out to indicate the Public Key of a station. They are sent out at regular intervals on a probing channel in place of normal probes. Other stations will use the Key Probes to determine the Public Key of other stations. The ID (32 bits), User Level (8 bits), and Public Key (16 to 128 bits) of the Sending Station are encrypted using the Network Operators Private Key. Thus other stations can verify the Public Key of the Sending Station by decrypting the message with the Public Key of the Network Operator.

| Format of Key response message from Network Operator | | | | |
|---|---|---|---|---|
| Message | Data | | Bit Len | Description |
| Message Type | | | 8 | Message Type = Key Response |
| Data 1 | User ID | | 32 | ID of station requesting key |
| Data 1 | User Level | | 8 | |
| Data 1 | User Public Key | | x | Public Key (x = 16 to 128 bits) |
| Data 2 | User Private Key | | x | Private Key (x = 16 to 128 bits) |
| Data 2 | Network Serial No | | 8 | Network Key Serial Number |
| Data 2 | Network Renewal | | 16 | Renewal Time in seconds (18 hours max) |
| Data 2 | Network Expire | | 16 | Expire Time in seconds (18 hours max) |
| Data 2 | Network Delete | | 16 | Delete Time in seconds (18 hours max) |
| Data 2 | Network Public Key | | x | Private Key (x = 16 to 128 bits) |
| Message Checksum | | | 16 | |

The Key response message is sent from the Network Operator to the user station requesting a key update. The data items marked Data 1 in the above table are encrypted using the Network Private Key. This means that any station with a valid Network Public Key would be able to extract the ID, Public Key, and User Level of the station transmitting this information in the Key Probe Packet.

Figure 4A:
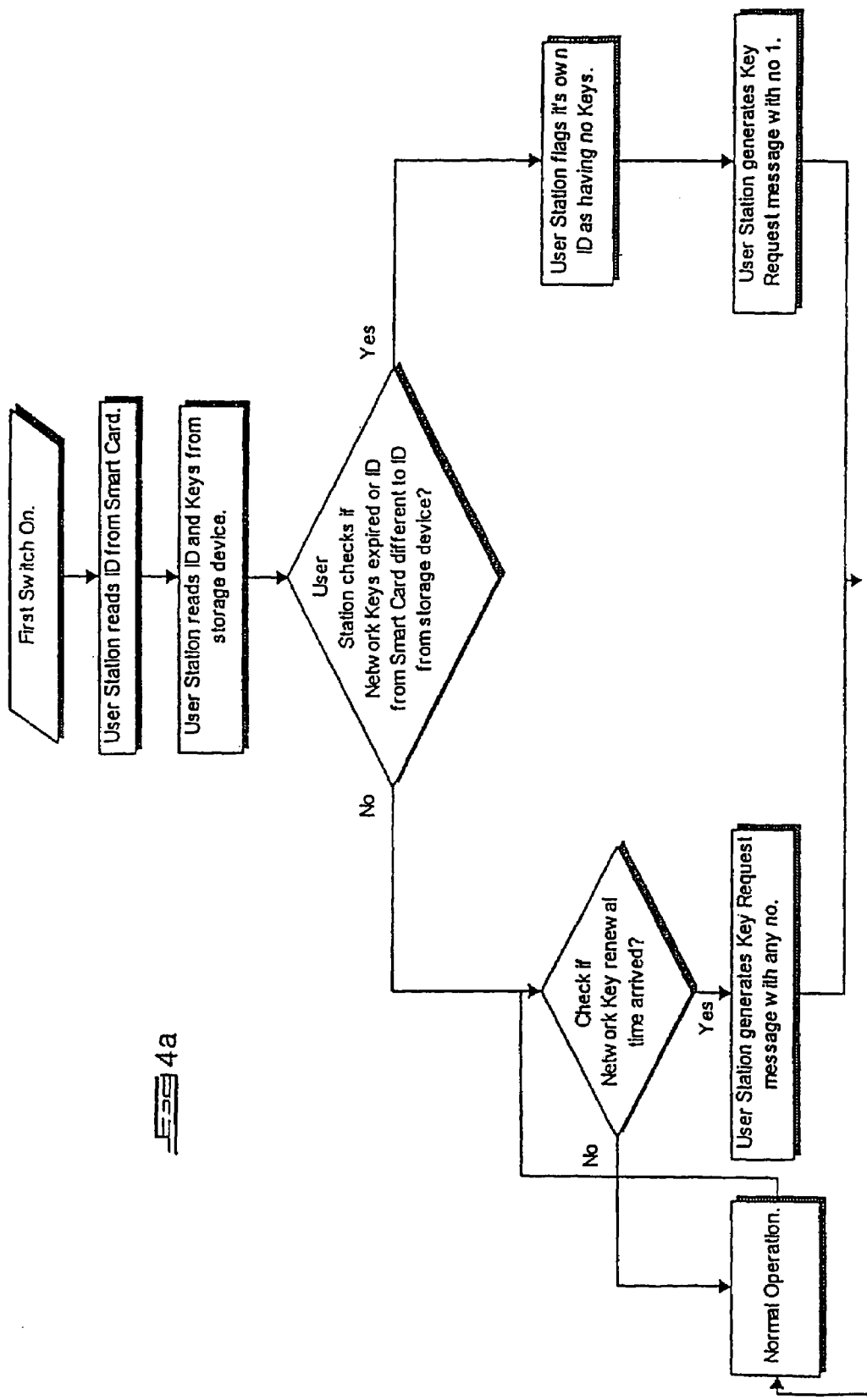
FIG. 4 is a more detailed flow chart illustrating the operation of the network protocol.

Data 2 and the encrypted Data 1 are combined and encrypted with the Public Key of the requesting station's RSA Smart Card (or Result A when using a DES Smart Card—see FIG. 4). The requesting station would then be able to extract the contents using its Private Key from the Smart Card. This is the only time that the Smart Card keys are used. The keys included in the Key response message will be used for all other signing and encryption. The length of the Smart Card key would typically be very long (e.g. 1024 bits) since this key will never change (unless the Smart Card is changed).

The renewal, expire, and delete times are all measured in relative seconds. When a user station requests a key update, the Network Operator calculates the relative time left until the current key must be renewed, etc. It places these respective relative time in seconds into the message. When the user station receives the message it subtracts the time the message spent in the network from the respective times. It then determines the absolute time at which the key must be renewed, expired, and deleted relative to its local clock.

The reason for using relative time is that less bits are required to indicate the time, and secondly not all user stations would have their clocks correctly synchronised. The time a message spends in the network can be accurately determined by the network protocol (typically within a few milliseconds).

The use of absolute times would work equally well, provided the clocks at the user stations can be kept reasonably synchronised. However, the authentication method described in this document allows for overlap of clocks that are not accurately synchronised.

The invention claimed is:
1. A method of operating a network comprising a network operator station and plurality of user stations, the method comprising:

generating at least one key required for use by
a plurality of user stations in the network,
the at least one key being necessary for
the authentication of the user station;
wherein any one of the plurality of user stations are
capable of being an intermediate user station;
transmitting to the network operator station, from a first
user station requiring a key,
a key request message containing
first status data indicative that
the key request message originates from
a user station lacking a key;
transmitting, from the network operator station to the first
user station,
a key data message containing
a key for use by the first user station and
second status data corresponding to
the first status data and
identifying the key data message as
a response to a key request message;
wherein any two user stations are capable of transmitting
a key data message to each other
through one or more intermediate user stations, and
wherein any user station
acting as an intermediate user station and
receiving the key data message
analyzes the received key data message to determine
whether
the received key data message,
contains the second status data, and
forwards the key data message to the first user
station if
the second status data thereof identifies the key
data message as
a response to a key request message.

2. A method according to claim 1 wherein the key request message from the first user station is received by at least one intermediate station and forwarded to the network operator station if the first status data thereof meets at least one predetermined criterion.

3. A method according to claim 2 wherein the key request message transmitted from the first user station contains first status data identifying the key request message as a first message transmitted by that station.

4. A method according to claim 2 wherein the key data message transmitted by the network operator station contains second status data identifying the key data message as a response to the key request message.

5. A method according to claim 1 including recording, at any user station receiving the key request message, the identity of the first user station and the first status data thereof.

6. A method according to claim 5 wherein, at user stations recording the first status data from the key request message, data corresponding to the identity of the first user station is flagged to indicate that the identity data may be used for no other purpose than the transmitting of a key data message originating at the network operator station to the first user station.

7. A method according to claim 1 wherein the key data message comprises a network operators public key which is utilized by the first user station and all active user stations to decrypt messages from other stations which are encrypted with that key's corresponding private key.

8. A method according to claim 7 wherein the key data message further comprises a station public key and a station private key allocated by the network operator to the first user station.

9. A method according to claim 8 wherein messages transmitted from an originating station to a destination station are encrypted at least partially using at least one of the private key of the originating station, the public key of the originating station, and the public key of the destination station.

10. A method according to claim 8 or claim 9 wherein each user station transmits a key probe signal from time to time, the key probe signal containing identification data and the station public key of the station transmitting the key probe signal, encrypted with the network operators private key, other stations receiving the key probe signal decrypting the signal using the network operator's public key to extract the identification data and station public key therefrom, for use when transmitting message data to the station which transmitted the key probe signal.

11. A method according to claim 1 wherein the key request message has a shorter length than data messages.

12. A method according to claim 1 wherein the key request message has a longer time to die than data messages.

13. A network comprising;
a network operator station; and
a plurality of user stations adapted to
transmit message data to one another,
via intermediate user stations,
wherein any one of the plurality of user stations are
capable of being an intermediate user station;
wherein any two user stations are capable of transmitting a key data message to each other
through one or more intermediate user stations, and
each user station comprising;
a transceiver for
sending data to and
receiving data from other stations in the network;
and processor means for;
(a) generating a key request message for transmission to the network operator station, the key request message containing
first status data indicative that the message originates from
a first user station lacking a key, the key being necessary for the authentication of the user stations; and
(b) receiving a key data message from the network operator station, the key data message containing
a key for use by the first user station and
second status data corresponding to
the first status data and
identifying the key data message as
a response to a key request message,
the network operating such that any two user stations are capable of transmitting a key data message to each other
through one or more intermediate user stations, and
such that any user station
acting as an intermediate user station and
receiving the key data message
analyzes the received key data message to determine whether
the received key data message
contains the second status data, and forwards the key data message to the first user station if
the second status data thereof identifies it as a response to a key request message, thereby to enable the first user station to communicate with other stations in the network.

14. A network according to claim 13 wherein each user station includes token reader means for reading identification data from a secure token associated with a user, the identification data being included in messages transmitted by the user station.

15. A network according to claim 14 wherein the secure token is a "smart card".

16. A user station adapted for use in a network, the network comprising a network operator station and a plurality of user stations adapted to transmit message data to one another via intermediate user stations,
the user station comprising;
a transceiver for
sending data to and
receiving data from other stations in the network;
token reader means for reading identification data from a secure token associated with a user; and
processor means for;
(a) generating a key request message for transmission to the network operator station, the key request message containing
first status data indicative that the message originates from
a first user station lacking a key, the key being necessary for the authentication of the user stations; and
(b) receiving a key data message from the network operator station, the key data message containing
a key for use by the first user station and
second status data corresponding to
the first status data and
identifying the key data message as
a response to a key request message,
the network operating such that any two user stations are capable of transmitting a key data message to each other
through one or more intermediate user stations, and such that any user station
acting as an intermediate user station and
receiving the key data message
analyzes the received key data message to determine whether
the received key data message
contains the second status data, and
forwards the key data message to the first user station if
the second status data thereof identifies it as a response to a key request message, thereby to enable the first user station to communicate with other stations in the network.

* * * * *